US006454649B1

(12) United States Patent
Mattice et al.

(10) Patent No.: US 6,454,649 B1
(45) Date of Patent: Sep. 24, 2002

(54) GAMING DEVICE AND METHOD USING PROGRAMMABLE DISPLAY SWITCH

(75) Inventors: Harold E. Mattice, Gardnerville; Richard Wilder, Sparks; Chauncey Warner Griswold, Reno, all of NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/166,472

(22) Filed: Oct. 5, 1998

(51) Int. Cl.[7] ................................................ A63F 13/00

(52) U.S. Cl. ............................ 463/17; 463/16; 463/18; 463/19

(58) Field of Search ......................... 463/16–19, 25–27, 463/37; 273/138.2, 143 R, 138.1; 345/30, 50; 368/70

(56) References Cited

U.S. PATENT DOCUMENTS 4,216,965 A 8/1980 Morrison et al. ........... 273/237
4,385,366 A * 5/1983 Housey, Jr. ................. 364/900
4,567,481 A * 1/1986 Meier et al. .................. 345/50
4,844,462 A 7/1989 Lubniewski ................. 273/86
4,856,787 A * 8/1989 Itkis ........................... 273/237
5,277,424 A 1/1994 Wilms ......................... 273/85
5,342,047 A * 8/1994 Heidel et al. ................. 273/85
5,346,399 A 9/1994 Sakow ....................... 434/201
5,882,261 A * 3/1999 Adams ........................ 463/20
6,056,642 A * 4/2000 Bennett ....................... 463/20
6,102,394 A * 8/2000 Wurz et al. .............. 273/138.2
6,117,010 A * 9/2000 Canterbury et al. .......... 463/20
6,126,542 A * 10/2000 Fier ............................ 463/16
6,227,970 B1 * 5/2001 Shimizu et al. ............... 463/20

FOREIGN PATENT DOCUMENTS

FR 2 693 120 A 1/1994

OTHER PUBLICATIONS

LC24.2 Trend Data Sheet;Version 1.01; Preh Electronics Inc.

Innovations; Preh Pierburg Group; LC Trend Series Programmable Pushbutton Switches.

* cited by examiner

*Primary Examiner*—Jessica Harrison
*Assistant Examiner*—Yveste G Cherubin
(74) *Attorney, Agent, or Firm*—George H. Gerstman; Seyfarth Shaw

(57) ABSTRACT

A gaming terminal with one or more input devices in the form of a programmable display switch is provided. The programmable display switch is preferably configured to provide different types of labels, legends, unction indications, instructions and the like depending on the state of the game and/or the type of game being played. In this way, a wide variety of game functions, game themes or types of games can be implemented while reducing the total number of switches on the gaming terminal. In some embodiments, programmable display switches replace some or all functions normally provided by less cost-effective devices such as CRTs or touch screens.

42 Claims, 13 Drawing Sheets

FIG. 8
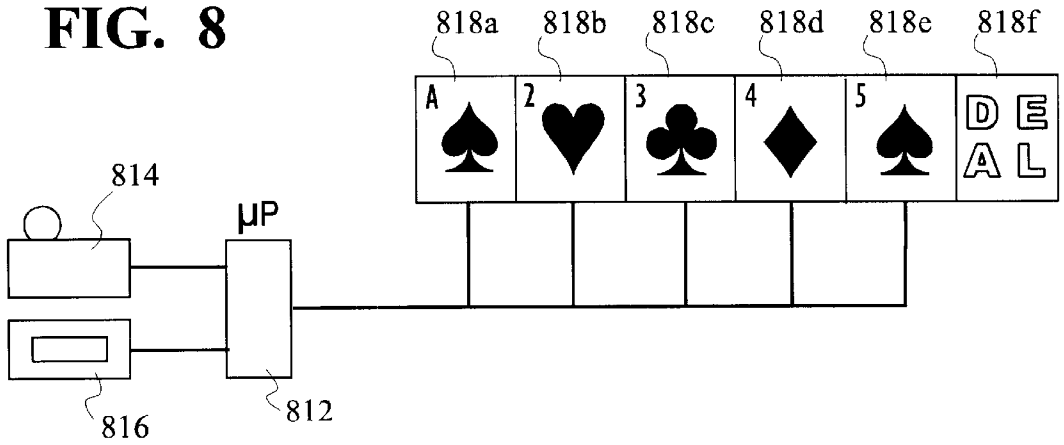
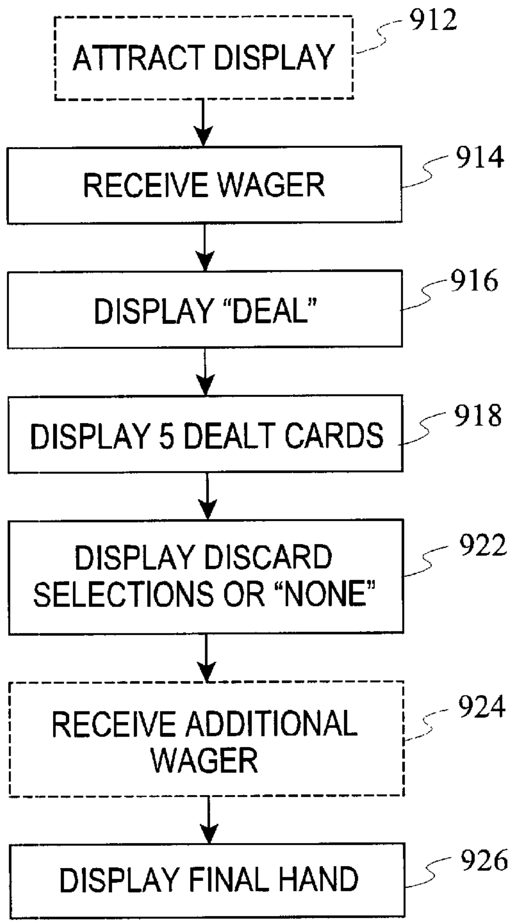
FIG. 9

GAMING DEVICE AND METHOD USING PROGRAMMABLE DISPLAY SWITCH

The present invention relates to a gaming terminal or other gaming device and methods for using which uses one or more user-pressable switches which have controllable or programmable displays or labels thereon, and in particular switches with movable activation surfaces with an array of liquid crystal or other programmable pixels.

BACKGROUND INFORMATION

Gaming devices or terminals (including, for example, slot machines, poker machines, blackjack machines, keno machines and the like) have been found to present particular challenges with respect to providing switches for user or player input to operate the game or gaming device, particularly when it is desired to provide the game or gaming device in a cost-effective manner. Like many controllable devices, gaming terminals often need to provide the capability for receiving different types of user input such as selecting among different choices at a given stage of a game and/or presenting various different sets of choices, for user selection, depending on which of multiple stages of a game have been reached. For example, many gaming terminals are configured to provide a main game component and a "bonus" game component in which the bonus component is not necessarily played as a part of each "round" of the main gaming component, e.g., in which the bonus game is only played in response to one or more predetermined outcomes of the main game component. In many situations, the bonus game involves user activation of user input or controls for functions which are different from functions which appear in the main game component. Unlike many other types of controllable machines or devices, gaming devices have particular needs to provide such various inputs while accommodating a situation in which the operation of many aspects of the game must be substantially unpredictable. In addition to providing unpredictability for purposes of increasing the interest or entertainment value provided by a gaming device, in many situations, gaming devices are regulated by government agencies which require an assurance of randomness or unpredictability in at least some aspects of game operation. Owing partly to such requirements for unpredictability, gaming devices present particular challenges for establishing user input or controls when the unpredictability means that the sequence, meaning and/or location of inputs or other game components cannot be known in advance.

Some previous approaches to design of gaming terminals involved including a plurality of different mechanical switches which may be activatable or usable at different times during the progress of a game. As used herein, a "mechanical" switch refers to a switch which is activated by touching or pressing a switch activation surface. Typically a mechanical switch involves movement of the activation surface, even if such movement is relatively slight. There are, however, touch or press-activated switches which respond to proximity, heat, interruption of a light beam and the like, where movement of the activation surface does not necessarily occur. As used herein, a mechanical switch, however, does not include a touch screen device in which touches of a region of a CRT or similar computer screen or monitor are detected. The variety of different types of user inputs which are typically provided in games designed to maintain user interest and entertainment has meant that a relatively large number of such mechanical switches have been provided in previous designs. The consequent proliferation of mechanical switches is associated with a number of disadvantages. The cost of a gaming terminal will typically increase as the number of discrete switches increases, owing not only to the cost of the switches themselves, but also to the costs for providing cabling or other connections to the various switches, power, control and the like. Furthermore, previous mechanical switches typically involve a degree of maintenance and/or repair, including the cost of monitoring and replacing burnt-out lighting, which is typically in the form of incandescent bulbs. In many situations, the amount of surface area which is available or feasible for positioning switches is relatively limited. This is partly because of practical and economic limits on the volume or areal space ("footprint") which is available in a casino or similar location for accommodating a gaming device and partly owing to limits on how accessible or reachable such buttons are to a player. The proliferation of mechanical switches can have a detrimental effect on attracting or retaining gaming terminal usage, e.g. because potential players may be intimidated by or confused by devices having a relatively large number of controls.

Furthermore, proliferation of controls or switches on a gaming device can increase the number of items which a gaming device manufacturer or a casino must maintain in inventory (for fabrication, repair or maintenance purposes) including maintaining the various labels or legends for each button or switch, providing adequate training for personnel who must install or replace such legends or labels and detecting and/or reconfiguring labels which have been incorrectly installed. Additionally, gaming devices which have relatively large number of mechanical switches can be relatively difficult to initially design and/or update or retrofit (e.g. when it is desired to change a gaming terminal which is configured for playing the first game into a gaming terminal which is configured for playing a second game).

Accordingly, it would be useful to provide gaming terminals which can achieve the desired gaming functions, to maintain high user interest, while reducing the number of controls, such as reducing the number of mechanical switches or buttons, without incurring substantially increased costs.

Although it may be possible to position mechanical switches or buttons adjacent a CRT, LCD or similar display (so that the display can provide button labels or legends with, e.g., arrows pointing to the respective adjacent buttons) it is believed that configurations with legends or labels which are physically spaced from the button activation surface are inordinately confusing to players and are often considered unattractive, thus reducing overall gaming terminal utilization.

In some devices, a single mechanical switch is used for two or more functions with each of the two or more functions being displayed on the button activation surface. It is believed that providing buttons with multiple legends, only one of which is applicable at any one time, is confusing to many players and is often perceived as unattractive. Although switches with multiple legends, or spaced-apart legends or devices with a relatively large number of switches may be useful in some contexts, including contexts where switch operation is performed by trained users, the potential for confusion in gaming terminals is relatively high when gaming terminals are used by members of the general public and thus by untrained users. Accordingly, it would be useful to provide a gaming terminal in a manner that user-activatable switches or similar controls will avoid player confusion and intimidation.

Some gaming terminals have been provided with certain user controls which are activated using a touch screen.

Touch screen controls, however, are relatively expensive and can undesirably add to the overall cost of fabricating, maintaining or repairing a gaming terminal. Furthermore, it is particularly difficult (or impossible) and/or expensive to operate touch screens having relatively fine spatial resolution and/or relatively rapid response times of a nature which may be desirable in certain types of games. For example, some games include at least an element of skill (such as requiring activation of a switch or other user input within a predetermined period after a certain type of display or other cue). Accordingly, it would be useful to provide a gaming device with the capability for receiving user input or displaying game cues (or other components) with a relatively rapid response time while avoiding the relatively high costs associated with rapid-response (or high-resolution) touch screens or similar approaches Preferably, such integrated display/control provides sufficient spatial and/or temporal resolution or response time to achieve attractive and interesting displays e.g. including image or character animation or other simulated motion, movable or controllable colors and the like.

Even when CRTs, or other computer monitor-type displays are provided without touch screen capabilities, overall gaming terminal costs can be relatively high, at least in part due to the relatively high cost of CRTs or similar displays. Such relatively high display costs are particularly burdensome when separate (spaced apart) switches or other controls must also be installed on a gaming terminal. Accordingly, it would be useful to provide a gaming terminal in which some or all display components can be combined with some or all switch or other control components to reduce the overall number of components in the gaming terminal.

SUMMARY OF THE INVENTION

The present invention involves a gaming terminal (and gaming use thereof) which provides one or more switches, preferably mechanical switches, having switch activation surfaces with changeable, controllable or programmable indicia such as characters, icons, logos and the like. In this way, a single switch can readily be used for different functions (such as functions during different portions of game play) in a manner that reduces the total number of switches or buttons on the gaming terminal and thus decreases cost, avoids player confusion and increases gaming terminal flexibility and the like. In one embodiment, the switch includes a backlight with the activation surface having a plurality of controllable pixels for selectively blocking portions of the backlight in a controllable pattern.

Preferably, the game can be in any of a number of different game states, e.g. in response to various game events including user input events and accordingly, in one embodiment, the switch is controlled to change a displayed legend or label in response to user input, including, in some cases, user input provided by activation of a switch. In one embodiment, the gaming terminal can be selected or readily reconfigured to play any of a plurality of different games, wherein the legends or labels displayed on at least one switch during the play of the game are dependent, at least in part, on which game is selected or configured. In one embodiment, the changeable legends or labels represent or form a part of the game such as a game in which particular user input is to be provided in response to (such as within a predetermined time after) a particular display on one or more switch activation surfaces.

BRIEF DESCRIPTION OF THE DRAWINGS

FIG. 8 is a block diagram of a card game device according to an embodiment of the present invention;

FIG. 9 is a game procedure for use in connection with an embodiment of FIG. 8;

DETAILED DESCRIPTION OF THE PREFERRED EMBODIMENT

Figure 1:
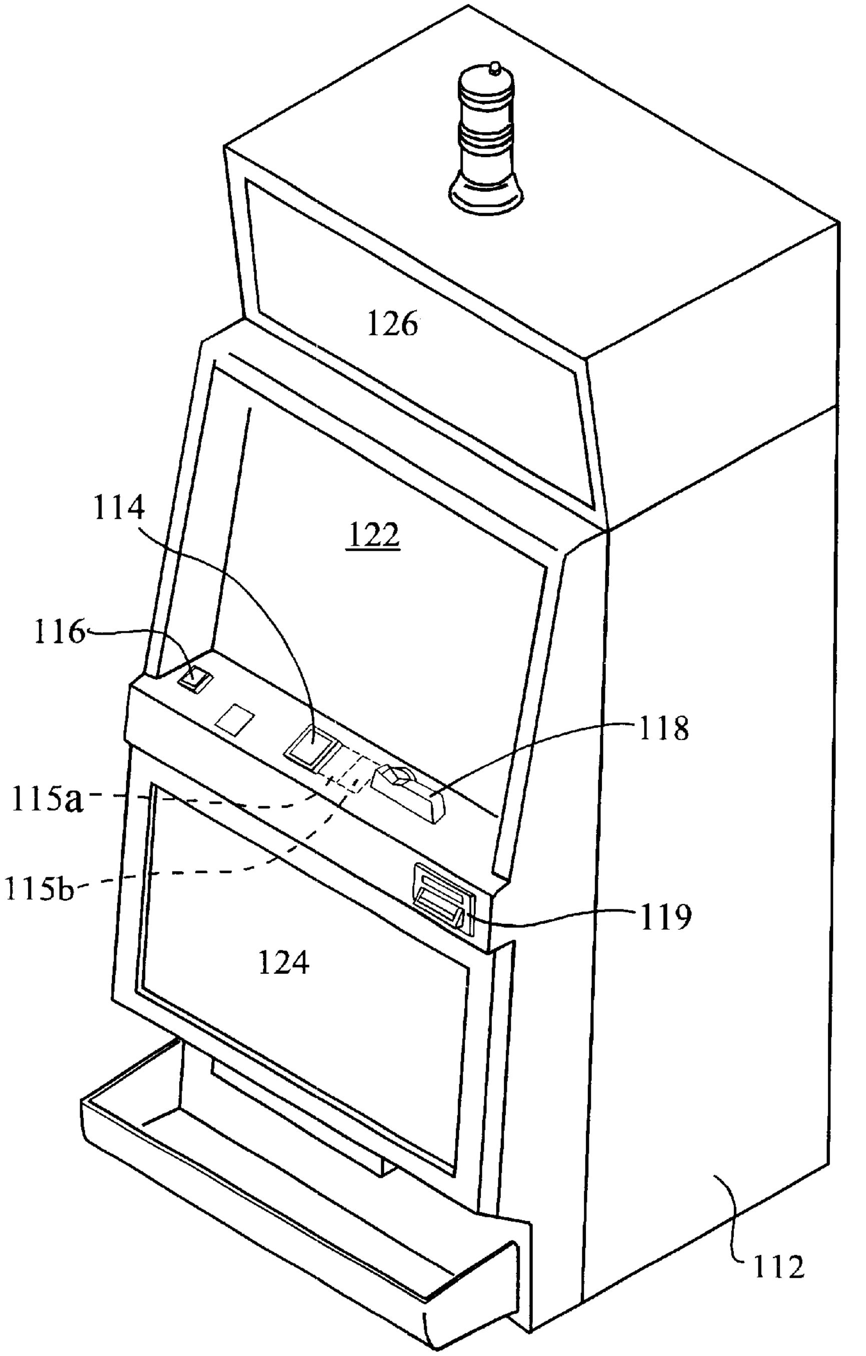
FIG. 1 is a perspective view of a gaming device with a programmable display switch according to an embodiment of the present invention.

As depicted in FIG. 1, a gaming terminal 112 may be provided with a programmable display switch module 114 for use e.g. in playing a game on the gaming terminal 112. Gaming terminal 112 may include a number of other components including one or more additional push-button type or other mechanical switches 116 (which may be either fixed-legend or programmable display switches) coin wager input 118, a bill acceptor 119, a CRT or other computer monitor-type display 122, regions 124, 126 for providing various components such as signage, instructions, attract displays, progressive game displays and the like. FIG. 1 depicts a programmable display switch module 114 spaced from other components. It is also possible to provide a plurality of adjacent display switch modules **115*a*, 115*b***, e.g., in an "array".

Figure 2:
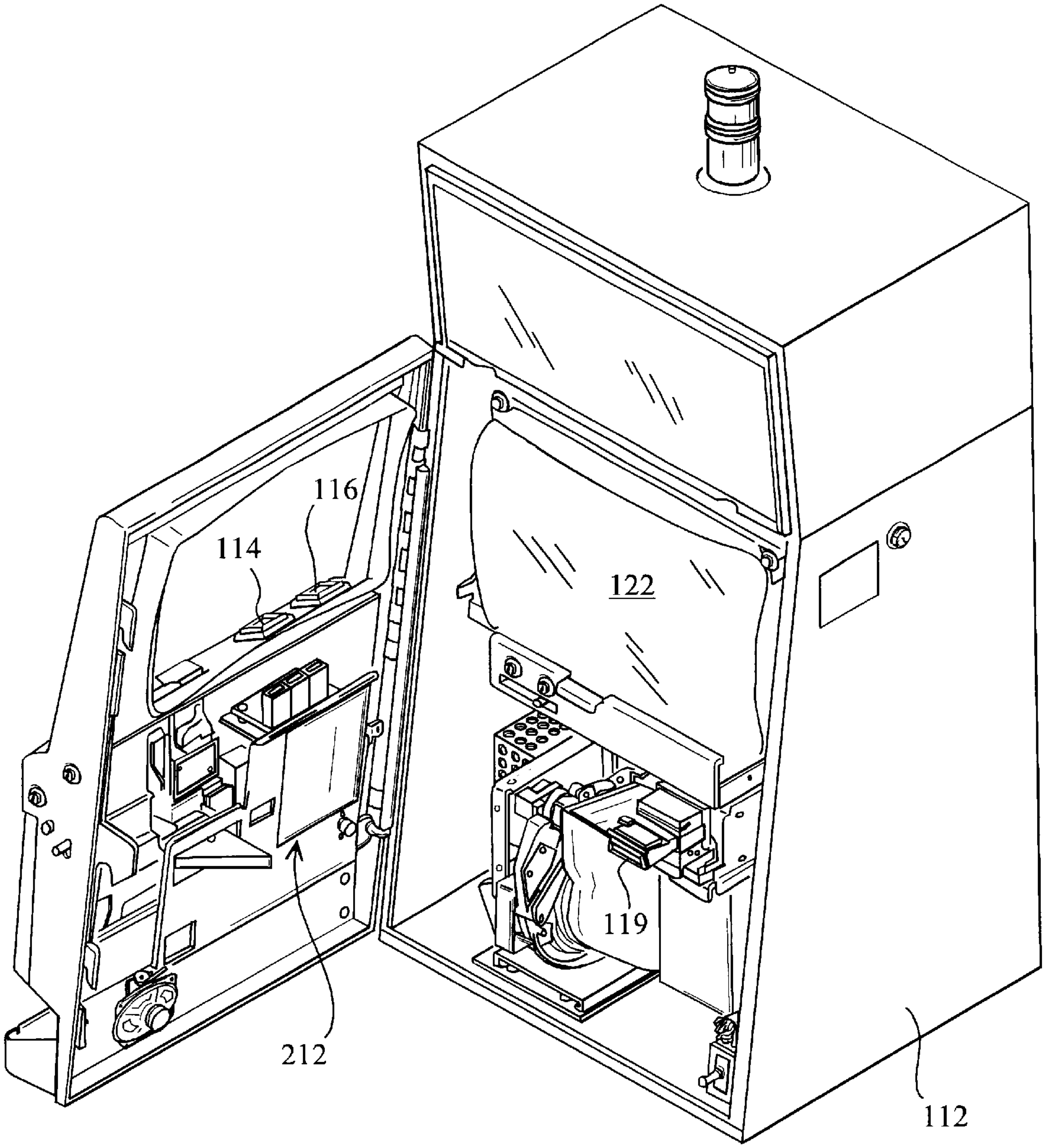
FIG. 2 is a perspective view of the gaming device of FIG. 1 with a door in an open position.

In order to coordinate operation of the programmable display switch module 1 14 with operation of the game, the programmable display switch module is coupled to a controller board 212 (FIG. 2) which, in turn, is coupled to a microprocessor which controls game operation e.g. via cables, fiber optics and the like, as described more thoroughly below.

Figure 3:
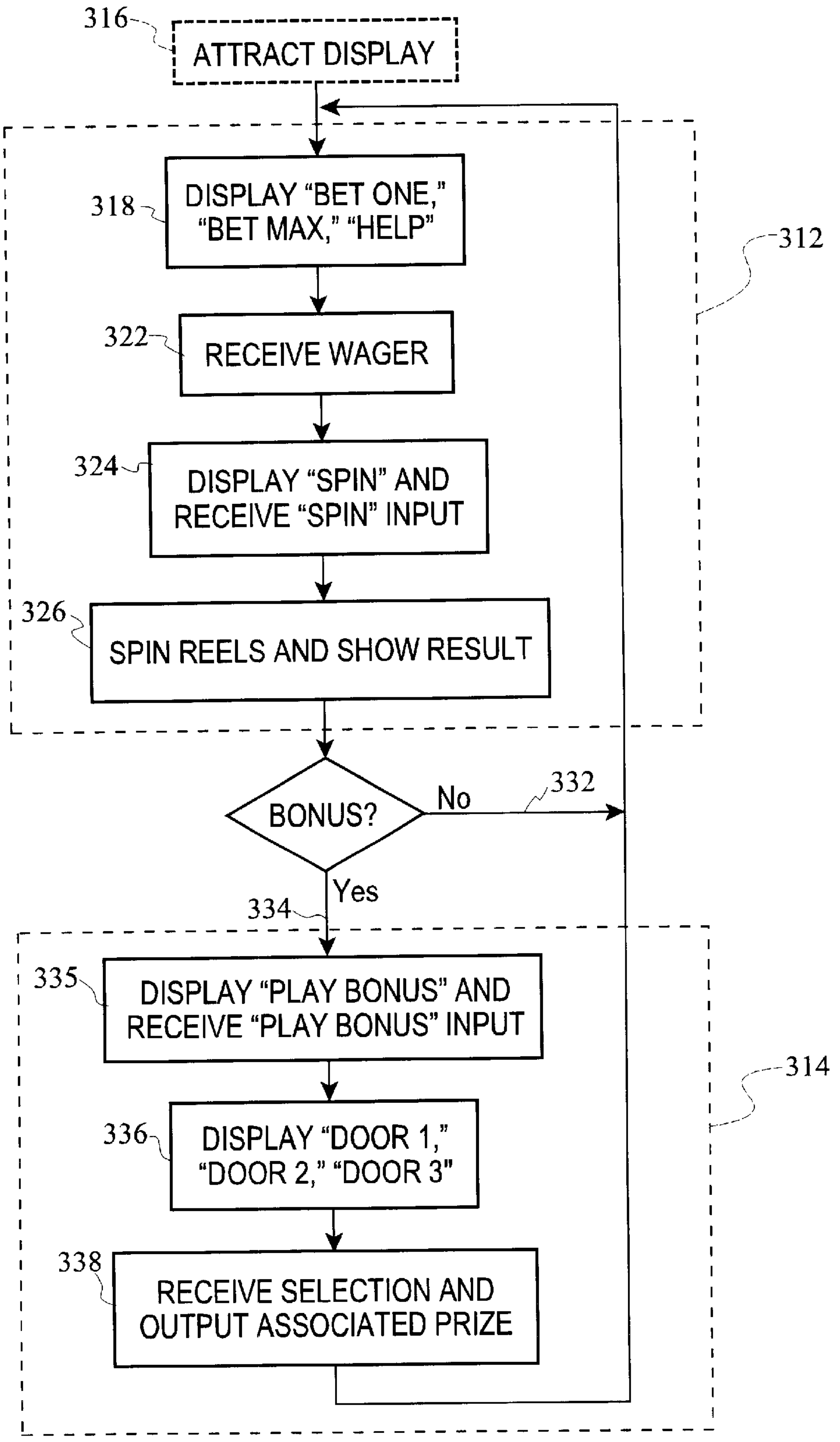
FIG. 3 is a flow chart of game procedure using a programmable display switch.

A gaming terminal 112 can typically be configured for use in playing a number of different types of games such as a slot machine game, a poker game, a blackjack game, and a plurality of other games as is generally well known to those of skill in the art. FIG. 3 provides an example of one game that may be implemented using the present invention. Although those of skill in the art will understand how to implement the present invention in the context of any of a plurality of different games, after understanding the present disclosure, the procedure of FIG. 3 provides an illustration of one such game. In the example illustrated in FIG. 3, the game includes two game portions, a first "slot machine" main game portion 312, and second bonus game portion 314 which, in this example, is a bonus game of the "select-a-door" type. Although many types of bonus games portions are possible, in one embodiment, a bonus game portion is played only when certain predefined results are obtained in the main game portion. For example, a game may be configured such that the bonus game portion is played only when the slot machine portion of the game shows a predetermined combination of symbols on a payline (such as 3 bars or 3 cherries) or a special "bonus" symbol on one of the reels (such as depicted in FIG. 11B).

In the embodiment of FIG. 3, when a gaming terminal has been idle for period of time, it is placed in an attract display mode 316. When a display screen 122 is included in the gaming terminal, the attract display 316 may include a display provided on such display screen. In one embodiment, an attract display is also provided on the user activation surface of one or more programmable display switches, such as providing an attract display across an array of such switches. In general, an attract display includes a display of items which are not used or are not needed during normal game-playing, and whose function is to draw attention to the gaming terminal to encourage play. As such, an attract display 316 may include a display of words, such as displaying available prizes, or may display images, logos, and the like, e.g. as may be associated with a game theme.

In the depicted embodiment, either during or after attract display 316, one or more programmable display switches are programmed to display legends or labels or such switches which are associated with an initial portion of the game such as "Bet 1", "Bet Max", "Help" and the like 318. As noted above, it is possible to configure a gaming terminal 1 12 with a plurality of switches, some or all of which may be programmable-display switches, and, in such situations, the different switches can be configured to display the different messages or labels. In this situation, the connection or interface between the programmable display switches and the gaming terminal microprocessor or other controller is such that the response of the gaming terminal to activation of a particular switch corresponds to the legend (e.g. pushing the "Help" button results in a display, on display screen 122, of instructions on how to play the game).

It is also possible to provide one or more programmable switches which have labels that are changed or varied through time. For example, a programmable display switch 114 can be configured to display "Bet 1" for five seconds, then to display "Bet Max" for five seconds, followed by displaying "Help" for five seconds. In this embodiment, the microprocessor or other controller is configured to react to the activation of a switch in a fashion which depends, at least in part, on the time at which the switch is activated, i.e. such that activating the switch while "Bet Max" is displayed results in placing the maximum allowable bet while pressing the same switch during the time when "Help" is displayed in an instructional display as described above. Although it is anticipated that such time-division or cycling of a switch function may result in a degree of unintended game option selections, it is believed to provide the advantage of assisting in reducing the total number of switches on the gaming terminal. The consequence of such unintended game option selections can be minimized by always making all but one of the cycle functions or options relatively innocuous (such as the "Help" function). Another feature of time division or cycling is to provide gaming features such as introducing player skill in a manner that the player must time the depression of the switch to coincide with a special offering. For example, the switch may be programmed to display a series of payout multipliers FIGS. 12A–C. If the player depresses the switch at different times (to coincide with a "double" or "triple" prize multiplier switch label) he may be entitled to a doubling or tripling of a payout award. Such multiplier may be skill related or randomly generated, e.g. depending on the exact depression time.

Figure 10A:
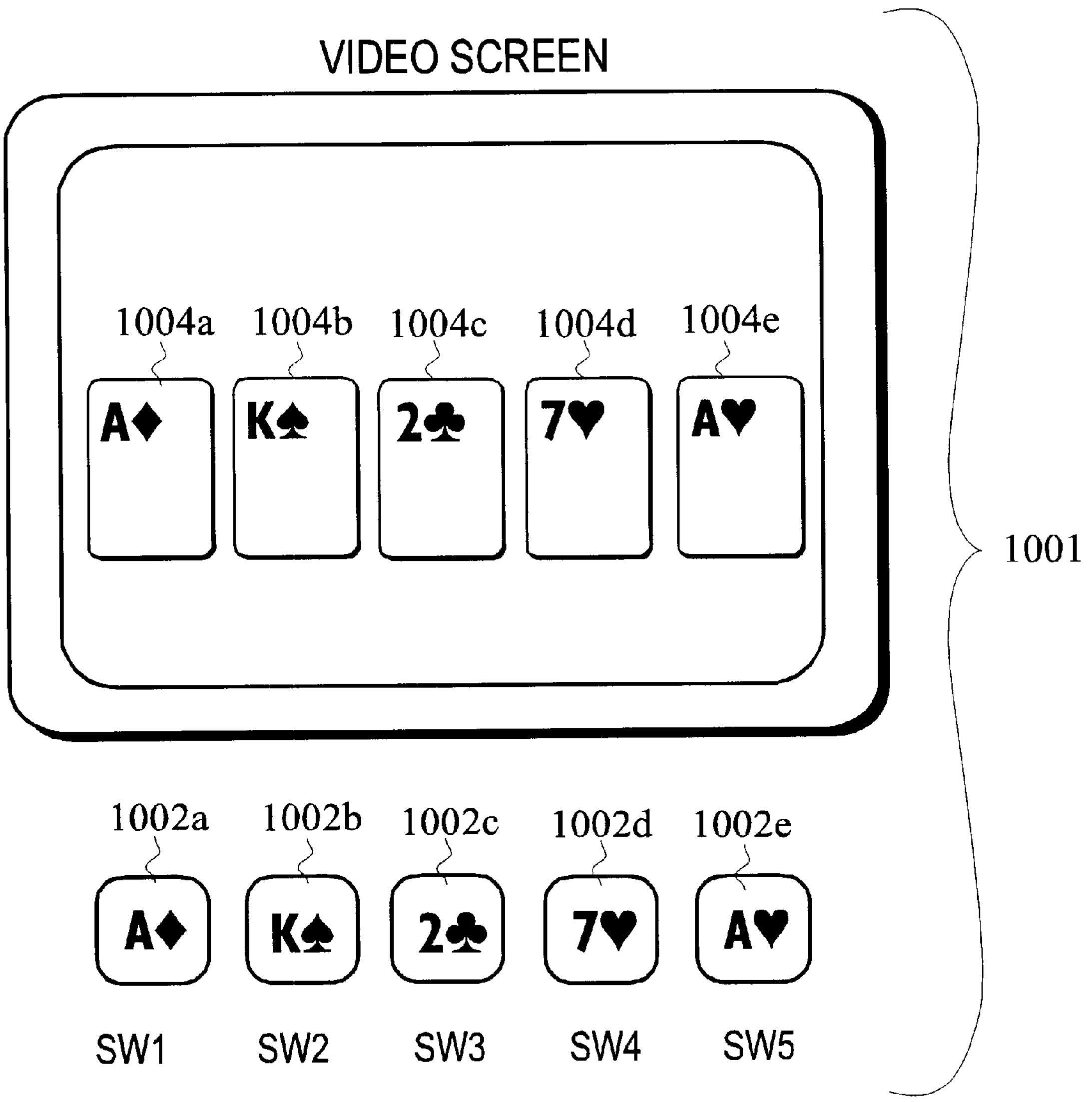
FIGS. 10A, B and C show a videoscreen and adjacent controllable-label switches of a video poker gaming device at three successive states of game play according to an embodiment of the present invention.
Figure 10B:
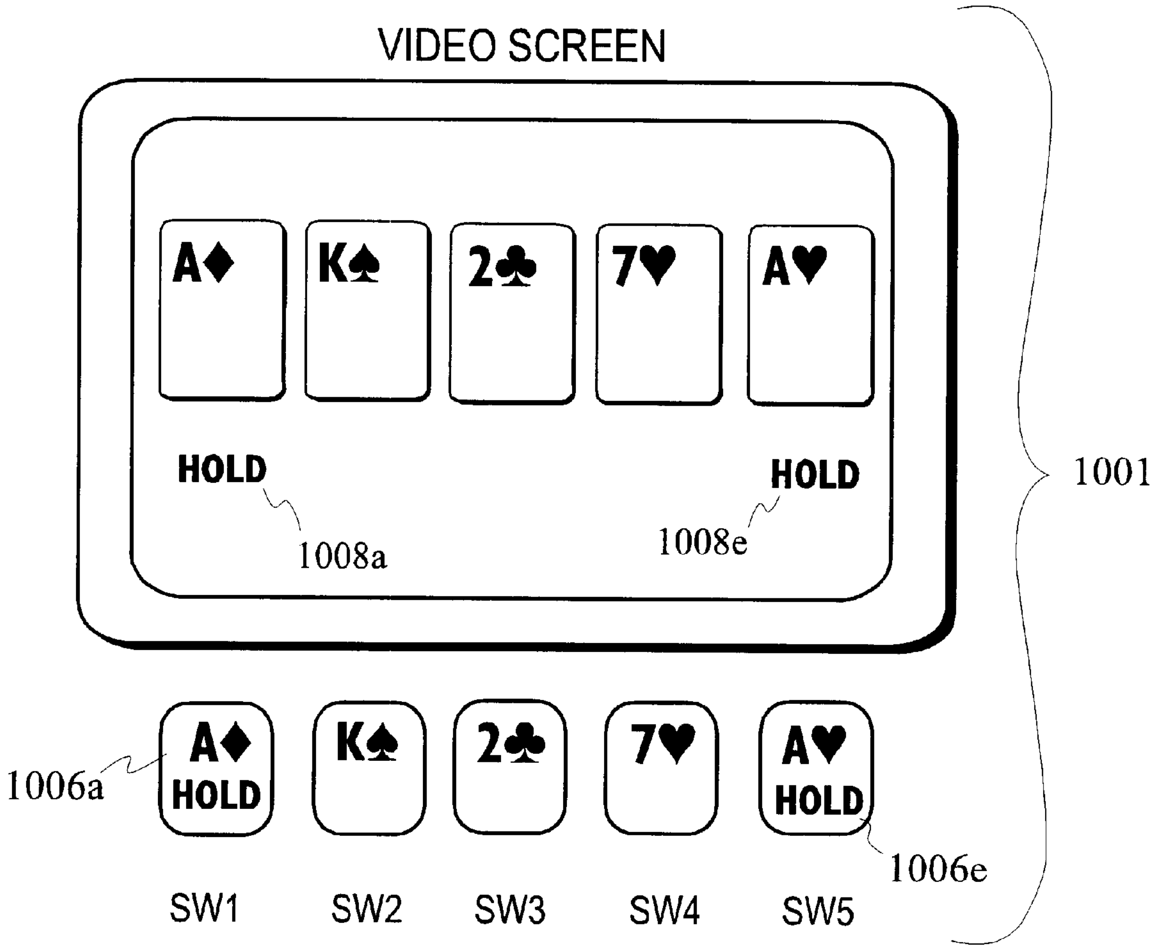
Figure 10C:
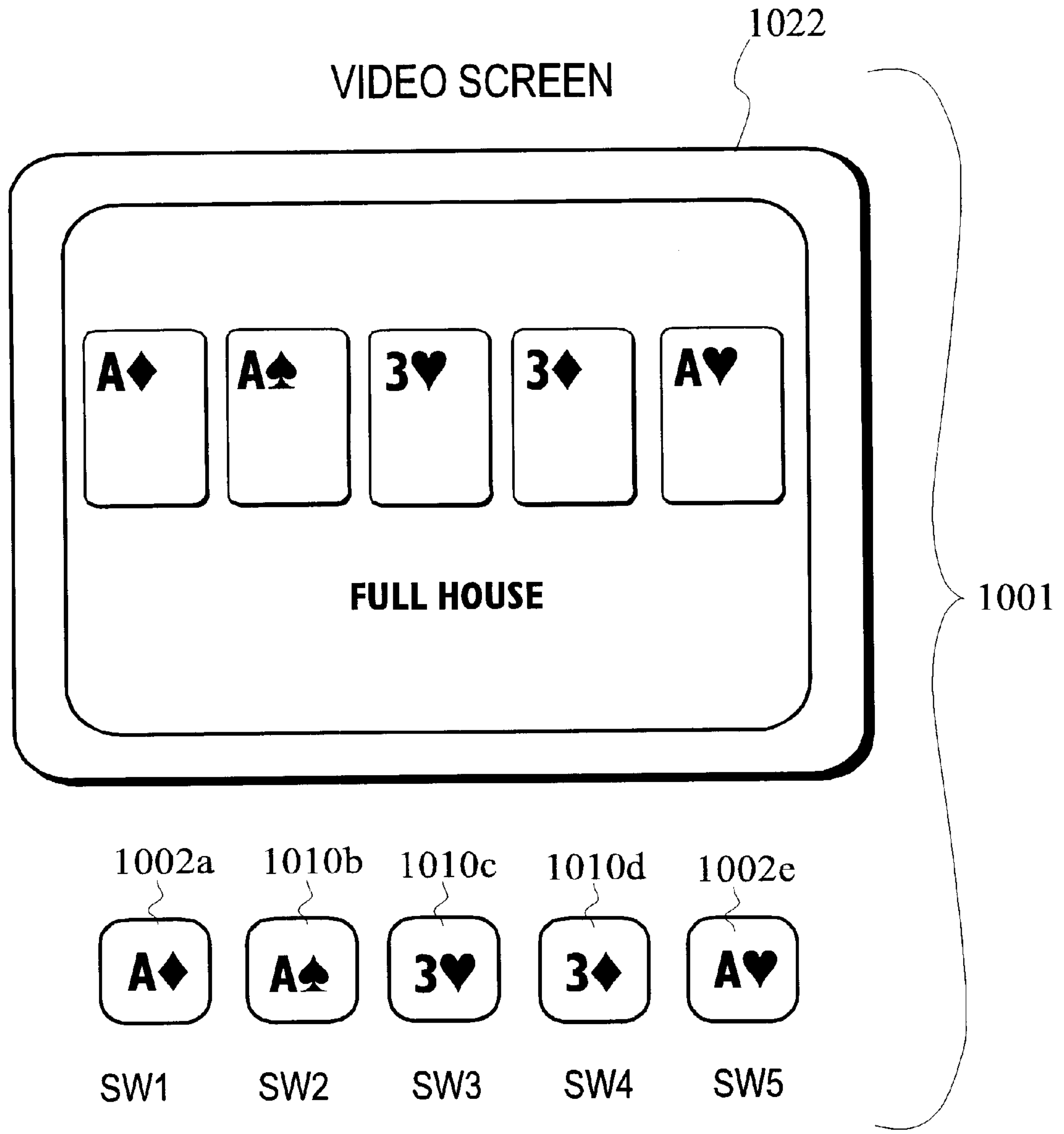

FIGS. 10A, B and C depict a portion 1001 of a gaming device having a video screen 1022 and a plurality of programmable-legend switches 1002*a–e* configured for playing video poker. In the stage of the game depicted in FIG. 10A, after five simulated cards have been "dealt" and displayed 1004*a–e* on the video screen 1022, the programmable-legend switches 1002*a–e* are configured to permit a player to select which of the five dealt cards the player wishes to "hold". In the embodiment of FIG. 10A, the programmable legend switches 1002*a–e* are controlled so that the legends correspond with the dealt cards respectively. Other configurations are also possible, such as providing legends which include (or alternate with) the words "press to hold" or similar instructions. FIG. 10B depicts the appearance of the portion 1001 of the gaming device after a player has selected the first and last cards 1004*a*, 1004*e* by depressing the first and last switches 1002*a*, 1002*e*. In the embodiment shown in FIG. 10B, the legend on the switches which have been depressed by the player change to indicate that those cards have been selected as hold cards 1006*a*, 1006*e*. In one embodiment, indicia 1008*a,e* indicating the held cards are also provided on the video screen 1022. After the player has made his hold selections, the non-held cards will be "discarded" (e.g. in response to activation of a discard button or other control, not shown) and replacement or draw cards are dealt. In the embodiment of FIG. 10C, the resulting hand is displayed on the video screen 1022 and also reflected on the indicia of the switch legends 1002*a*, 1002*e*, 1010*b, c,d*. Other features of the game and gaming device can be substantially similar to those ordinarily used for a video poker game, as will be known to those of skill in the art after understanding the present disclosure.

Figure 11A:
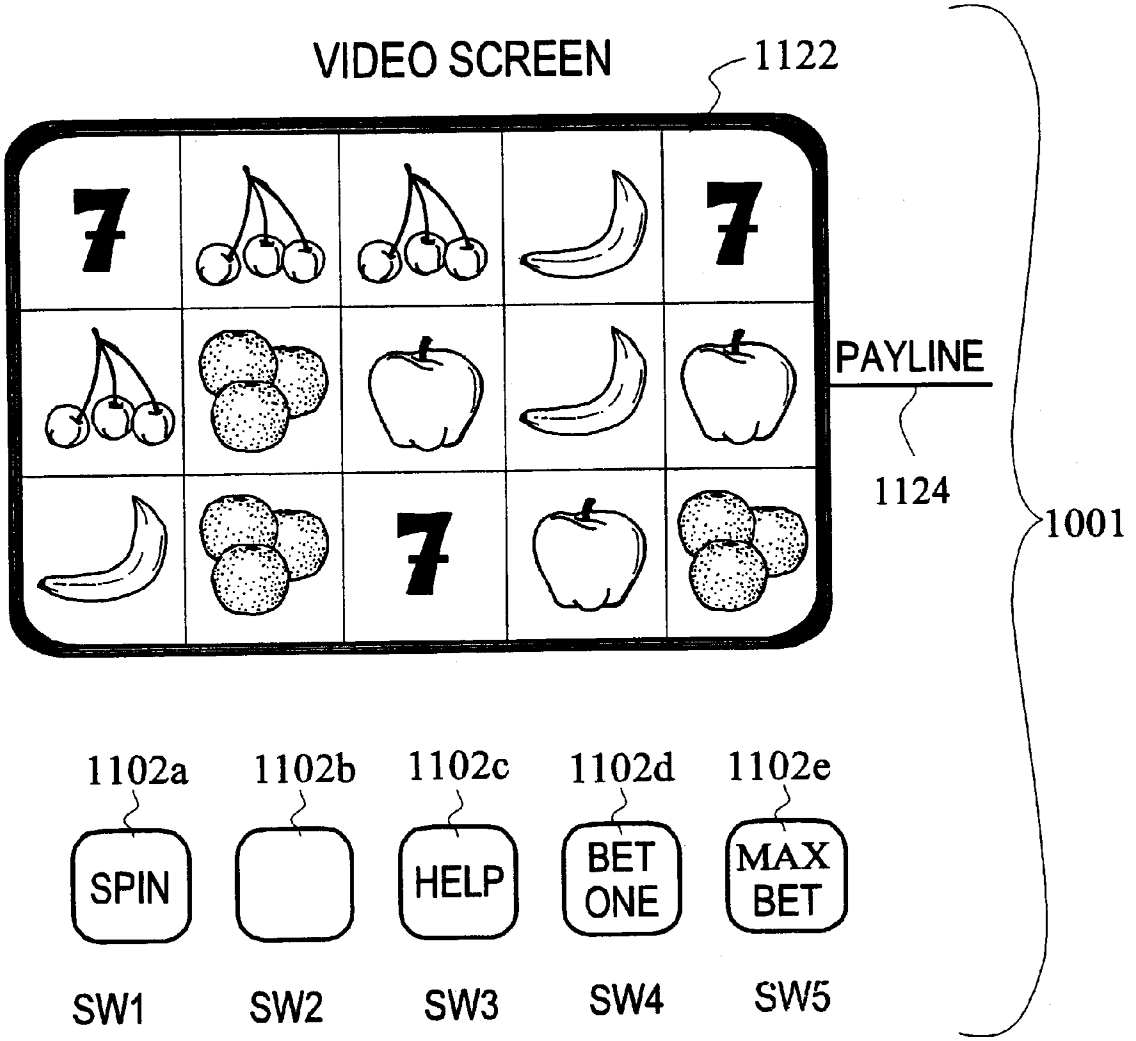
FIGS. 11A, B and C show a video screen and adjacent controllable label switches of a video slot machine gaming device at three successive states of game play according to an embodiment of the present invention.
Figure 11B:
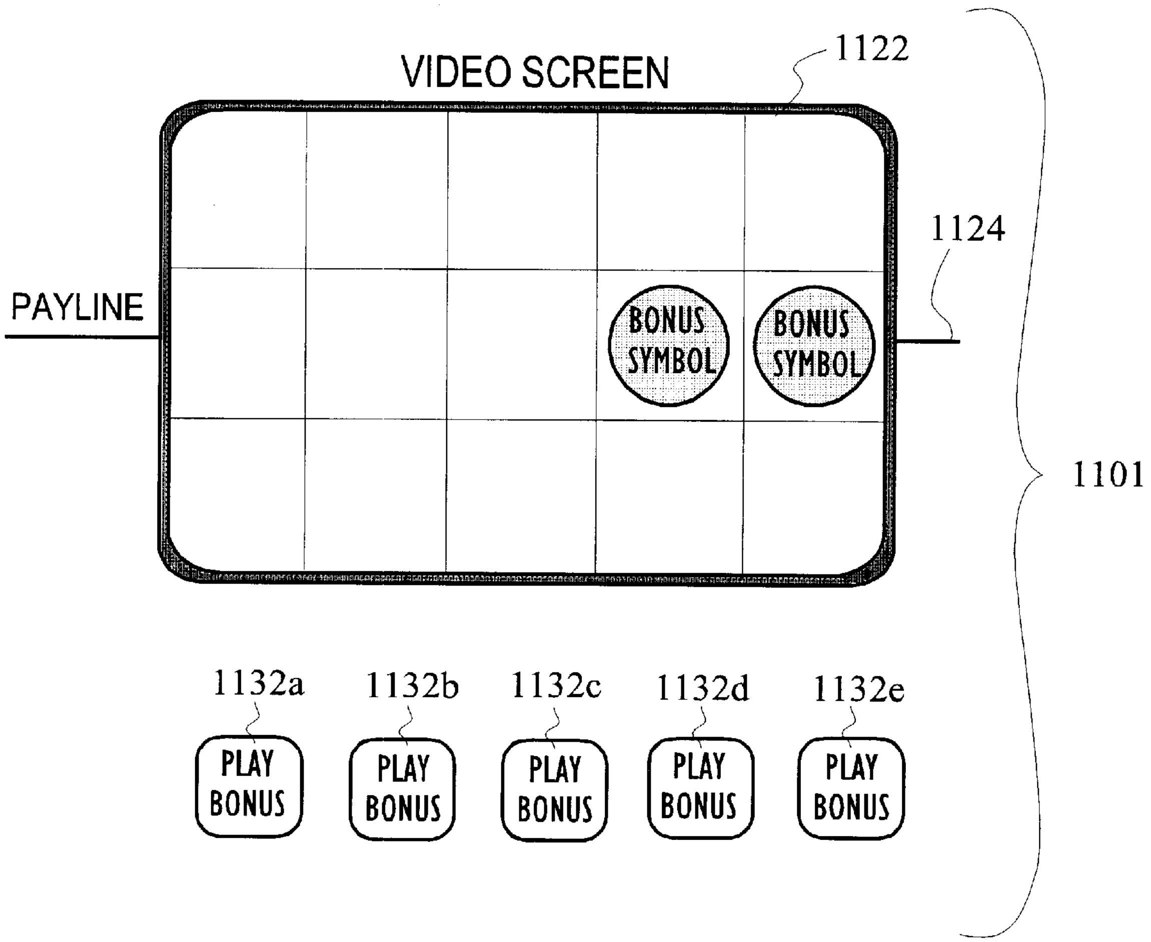
Figure 11C:
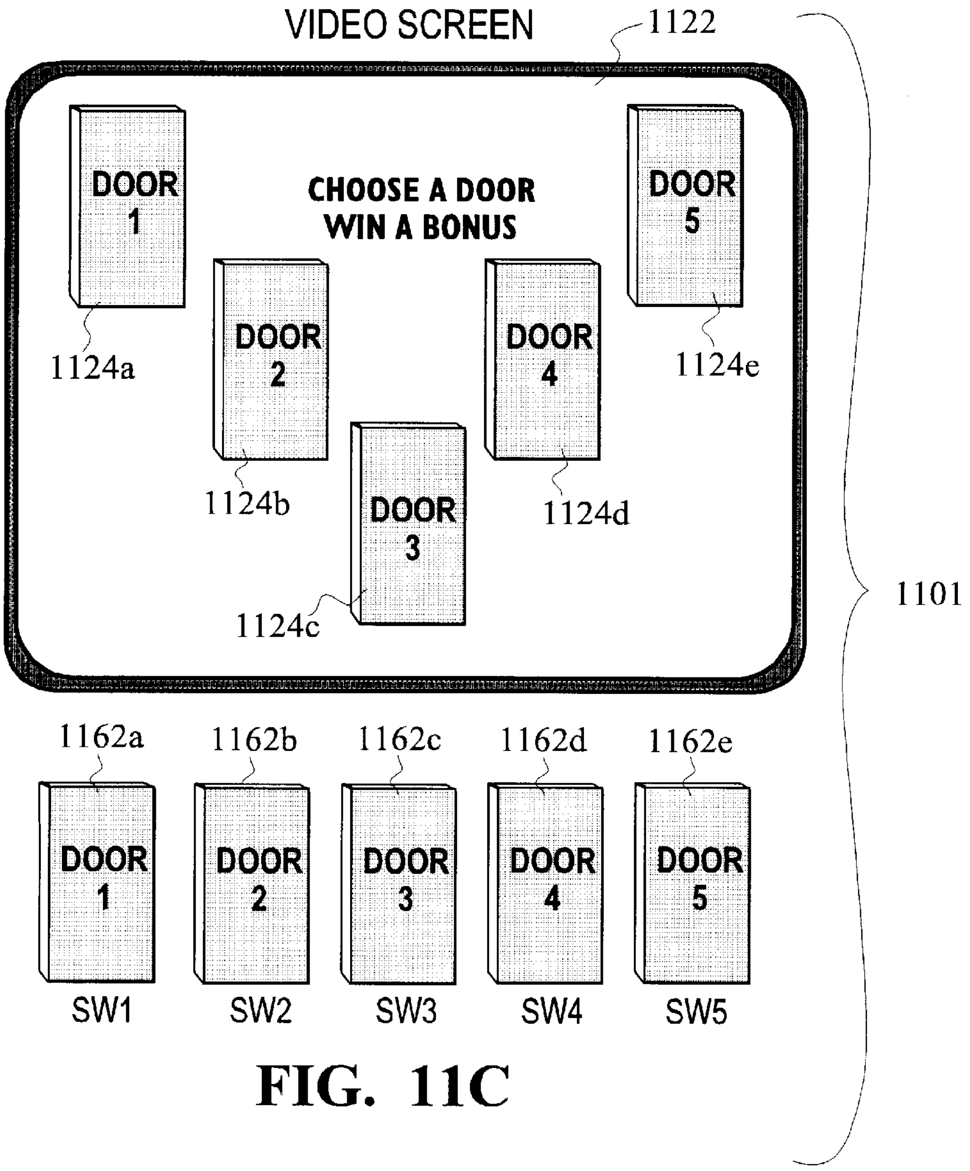

FIGS. 11A–11C depict a portion 1101 of a gaming device in a fashion similar to that of FIGS. 10A–10C but in which the gaming device is configured for playing a video slot machine game. FIG. 11A depicts the portion 1101 of the device as it appears before game play. In the configuration of FIG. 11A, the video screen 1122 is controlled to simulate the display of a five reel slot machine with standard slot machine symbols displayed on each of the simulated reels and defining one or more paylines 1124. In the embodiment of FIG. 11A, the programmable display switches 1102*a*–1102*e* are configured to perform a first set of functions as indicated on the legends for the switches such as a spin function 1102*a*, a help function 1102*c*, a bet one function 1102*d*, and a max bet function 1102*e*. After a player has initiated a spin (e.g. by placing a wager and pressing the spin button 1102*a*) in some instances one or more bonus symbols 1112a, 1112*b* may be displayed as simulated reel symbols. Depending on the configuration of the game, the appearance of the bonus symbols, e.g. on the payline 1124, may in some circumstances (e.g. if the player has previously placed the maximum bet) permit the player to participate in a bonus game portion. In the configuration of FIG. 11B, one or more of the programmable display switches are configured to perform a different function (i.e. different from the functions of the switches as configured in FIG. 11A) namely to initiate the bonus portion of the game by depressing the button. Preferably, the label of the programmable display buttons is controlled to indicate the current function of the button such as by displaying a "play bonus" label 1132*a–e*. In one embodiment, the programmable display switches are configured such that switch depression results in beginning the bonus portion only if all the conditions for the bonus portion have been met (e.g. the appearance of a bonus symbol 1112*a* on the payline after placing a maximum bet). Preferably, the "play bonus" legend does not appear on the programmable display switches unless the player is actually eligible for the bonus portion of the game. For example, the "play bonus" legend would not appear if the player had not previously placed a maximum bet. In this way, ease of play is promoted and player confusion is avoided since the device does not result in buttons having labels indicating functions which are not currently available. Although FIG. 11B shows all five depicted programmable display switches as bearing the "play bonus" legend, if desired, the device could be configured so that fewer than five (such as one) programmable display switch will provide the play bonus function and will display the "play bonus" label. In another embodiment the player may be provided with a choice among several different bonus portions, each activatable by depressing a different programmable display switch, whose respective legends preferably indicate the type of bonus game portion available.

In the configuration of FIG. 11C, the player has progressed to a "choose a door" type of bonus game portion in which a player will be awarded a prize, in response to choosing one of five illustrated "doors" 1124*a*–1124*e*, by selecting one of the programmable display switches which have been configured to bear corresponding labels 1162*a–e*.

Accordingly, it can be seen from the illustration of FIGS. 10A, B, C and 11A,B,C that there are various ways in which a gaming device can be configured in such a way as to utilize programmable display switches in conjunction with playing a game in which the switches display different labels at different times during the respective games and can be used in conjunction with performing different functions, preferably corresponding to or indicated by the labels displayed at any given time.

In the embodiment of FIG. 3, the player at the gaming terminal receives a wager 322 (e.g. by activation of a "Bet Max" or "Bet 1" switch, use of a coin input 118, a bill acceptor 119, a card reader or the like). In response to the receipt of wager 322, the gaming device 112 displays a "spin" legend on a switch 324 such as a programmable display switch 114. By using the same programmable display switch for displaying "spin" as was used for displaying another label (and performing another function, such as "Bet Max") at another time, the total number of switches needed can be reduced. Since, in this configuration, there was no need to provide more than one different functional legend or label on a switch at any given time, it is believed customer confusion can be reduced. Reduction in customer confusion is also facilitated by configuring the gaming terminal such that at any given time, only legends or labels which are appropriate or usable at a given time or stage during the play of a game are displayed during that time. For example, since it is not possible to initiate a slot machine reel spin prior to placing the wager, the machine is preferably configured such that no switches display the "spin" label until after at least an initial wager has been placed.

Figure 12A:
FIGS. 12A, B, and C and 13A and B are plan views of controllable label switch surfaces with various labels, according to embodiments of the past invention.
Figure 12B:
Figure 12C:

In the embodiment of FIG. 3, in response to activation of a switch which bears the "spin" label 324, the gaming device spins (physical or simulated) slot machine reels and displays the results, typically as three or more symbols displayed along one or more pay lines 326. If the result is not a result associated with a bonus game portion, then play returns 332 to permit another round of the game to be played. If the result of the reel spin is a result which is associated with initiation of a bonus game portion 334, the play may initiate the bonus game portion e.g. by activating a switch which displays a "play bonus" label 335, whereupon the gaming device is configured to present the player with an opportunity to (in the illustrative example of FIG. 3) select among different "doors" (at least some of which will be associated with the award of a prize). Preferably, the gaming terminal displays "Door 1", "Door 2" and "Door 3" etc. on the labels of programmable display switch modules (e.g. as depicted in FIG. 11C) so that a user can make the desired selection by pressing one of these legends 336. In response to a selection of Door 1, Door 2, or Door 3, the gaming terminal will output any associated prize 338. A multiplier, or other special feature may be displayed on a switch at this time (FIGS. 12A–C). The switch may be set to cycle through a sequence of multipliers, to provide, for example, one two times, and three times the payout award amount. A multiplier sequence may be set to change quickly such that the player must time the switch depression to get the highest possible multipliers. As such, the various multiplier amounts may appear less often if they are worth more. Alternatively, the multipliers may be randomly generated so that the player is unaware of the multiplier selected until after the switch is depressed.

Thereafter, the procedure loops 342 to permit the user to initiate another round of the game. Preferably, at least one of the switches used to display "Door 1", "Door 2", or "Door 3", and more preferably, all such switches, are switches which were used for a different function (and bore a different label) during the main game portion 312. For example, it is possible to use a single programmable display switch 114 to perform the "spin" function (1102*a*, FIG. 11A) at step 318, perform the "play bonus" function (1132*a*, FIG. 11B) at 324, perform the "Door 1" function (1162*a*, FIG. 11B) at step 336, and perform the multiplier function (FIGS. 12A–C) at other times. In this way, the total number of switches can be reduced and the potential for customer confusion can be likewise reduced.

Figure 4:
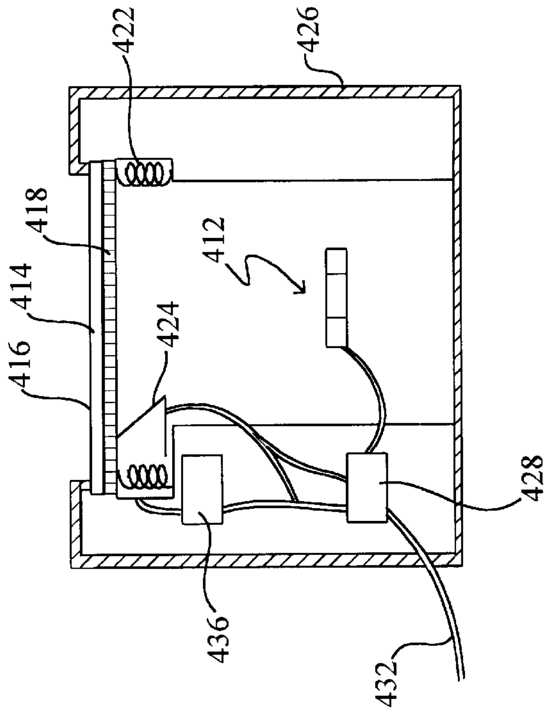
FIG. 4 is a block diagram of certain components of one type of programmable display switch.

FIG. 4 provides a block or generic illustration of some of the components of a programmable display switch. In the embodiment of FIG. 4, a backlight illumination source, such as selectably-activatable, colored light emitting diodes (LEDs) 412 provide backlight illumination of a selectable color to the switch activation surface 414 such as red, orange, or green backlighting or combinations thereof. The switch activation surface 414 includes a transparent or translucent covering 416 over a controllable pixel array such as a liquid crystal (LC) array 418. Preferably each pixel can be in a transmissive state (to permit the backlight to be transmitted to the viewable surface) or a blocking state (to block the backlight, providing a dark or black pixel at the corresponding location of the activation surface). Preferably, sufficient pixels are provided to permit display of a wide range of characters, images, logos, symbols and the like, such as providing an array of 32×16 pixels or 36×24 pixels. Preferably, the entire activation surface 416 is pressable or movable e.g. against the urging of springs 422 or other force devices. Although it is possible to construct switches using film or other deformable surfaces, proximity sensors and the like, it is believed that the tactile feedback achieved with a fully-movable activation surface 416 assists in providing users with a level of comfort and familiarity and avoids customer confusion. A contact switch or similar component 424 is used to sense movement of the activation surface. In one embodiment, the switch element is a normally open (NO) switch. The state of the switch can be changed by the player or the casino operator. The switch portion of the module acts like a momentary on/off switch. Preferably, the switch housing 426 contains a switch control unit 428 which, in response to receipt of one or more control signals 432 can provide the desired on/off and/or color switching of the backlighting 412 and can send pixel control information to an internal pixel refresh unit 436 for displaying and retaining the desired characters or images on the activation surface 416. One example of a programmable display switch of a type which can be used in connection with the present invention are those available under the trade designation "LC Trend Series" from Preh Electronics Inc. of Lake Zurich, Ill.

Figure 5:
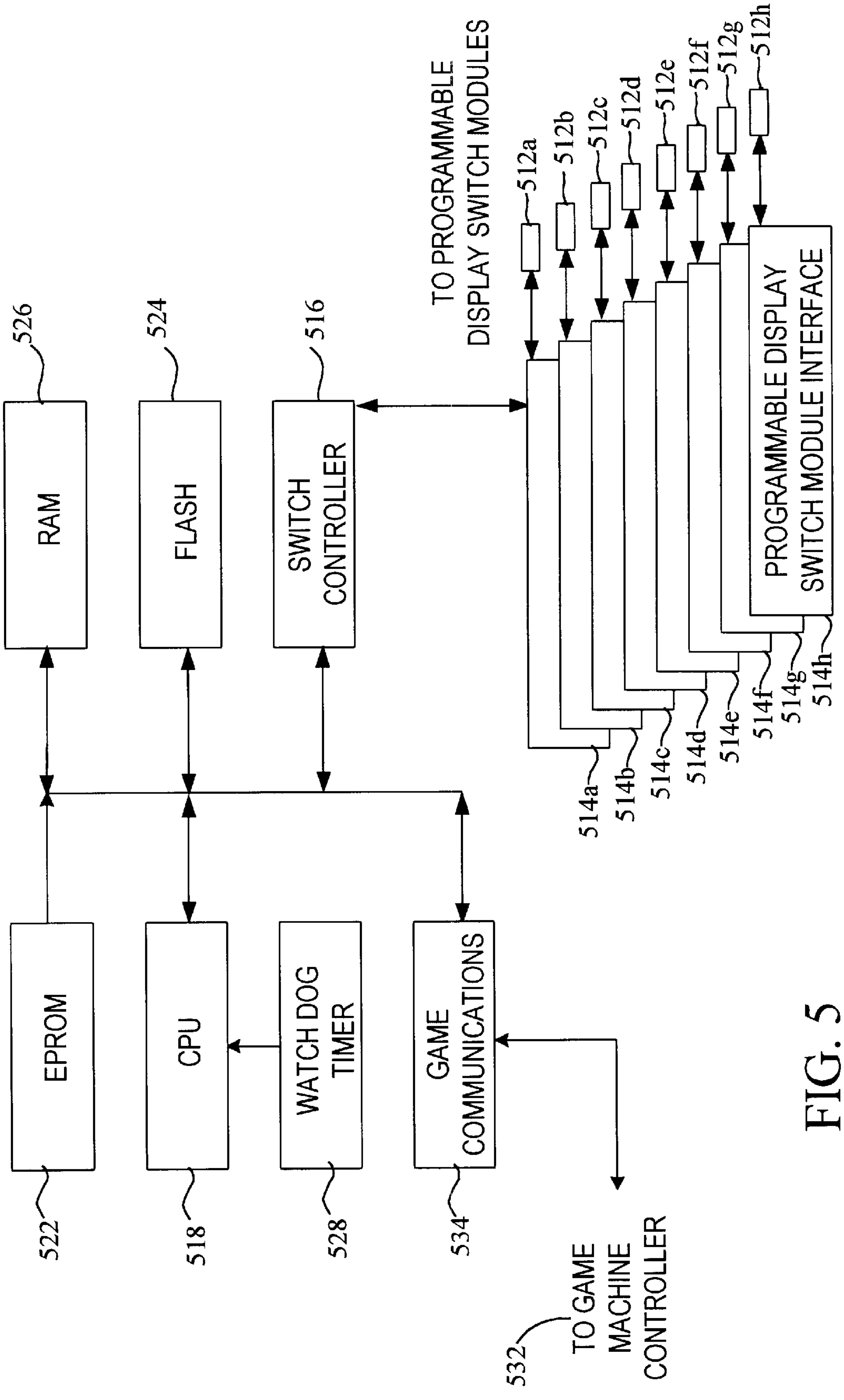
FIG. 5 is a block diagram of a controller board for a programmable display switch according to an embodiment of the present invention.

In the embodiment depicted in FIG. 5, a plurality of (in this case, 8) programmable display switch modules 512*a*–512*h* are coupled, respectively, to a plurality of switch interfaces 514*a–h* containing circuitry for connecting the programmable display switch modules 512*a*–512*h* to a switch controller 516 (described more thoroughly below and depicted in FIG. 7). The switch controller 516 provides circuitry for interfacing between the gaming terminal microprocessor CPU 518 and the programmable display switch modules 512*a*–512*h*. The CPU 518 is used for controlling the operation of the game, including controlling, and receiving signals from, the programmable display switch modules 512*a*–512*h*. A CPU 518 operates in accordance with instructions stored in memory including electronically programmable read-only memory (EPROM) 522 and flash memory (non-volatile electrical programmable random access memory)524. As is well known in the art, the CPU 518 uses random access memory 526 for temporary storage and is in communication with a watchdog timer 528 e.g. for interrupting the CPU 518 in response to a system-level malfunction. If desired, the gaming terminal 112 may be coupled to an external device such as a game machine controller 532 e.g. via a communications module 534.

Figure 6:
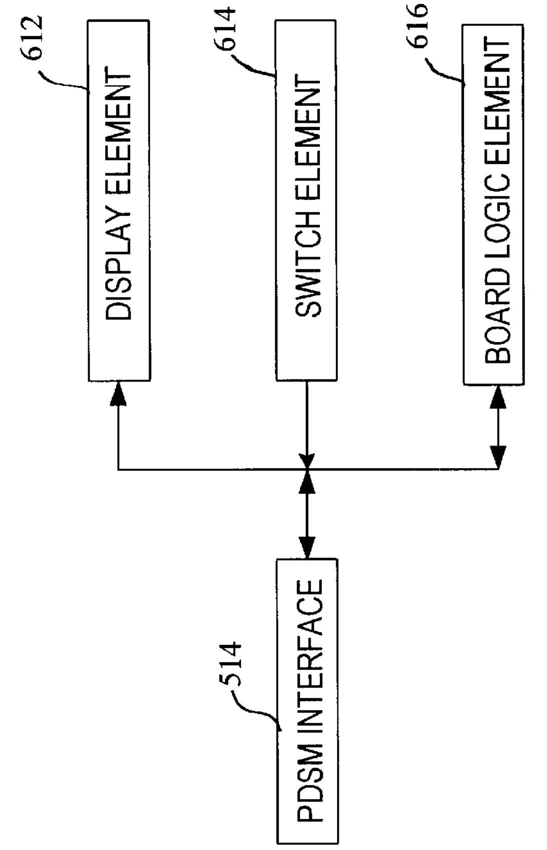
FIG. 6 is a block diagram of a wiring board for a programmable display switch according to an embodiment of the present invention.

As depicted in FIG. 6, the interface 514 provides links to a display element of the programmable display switch 612, receives input from the switch element 614, communicates with the switch module circuitry which provides board level logic back to the programmable display switch module controller printed wiring board 616. The switch controller depicted in FIG. 7 receives inputs indicating switch closure events or switched states (8 input lines in the configuration of FIG. 7, corresponding to the 8 programmable display modules depicted in FIG. 5) 712 and outputs, on one of eight sets of serial and data lines, depending on which of (in the depicted embodiment) 8 switches are to be programmed 714, for programming the display, preferably including programming the backlighting and programming the liquid crystal array. The controller communicates with the CPU using a number of signal lines 716 which may form portions of data, address, controller or other buses in the gaming terminal system.

Figure 7:
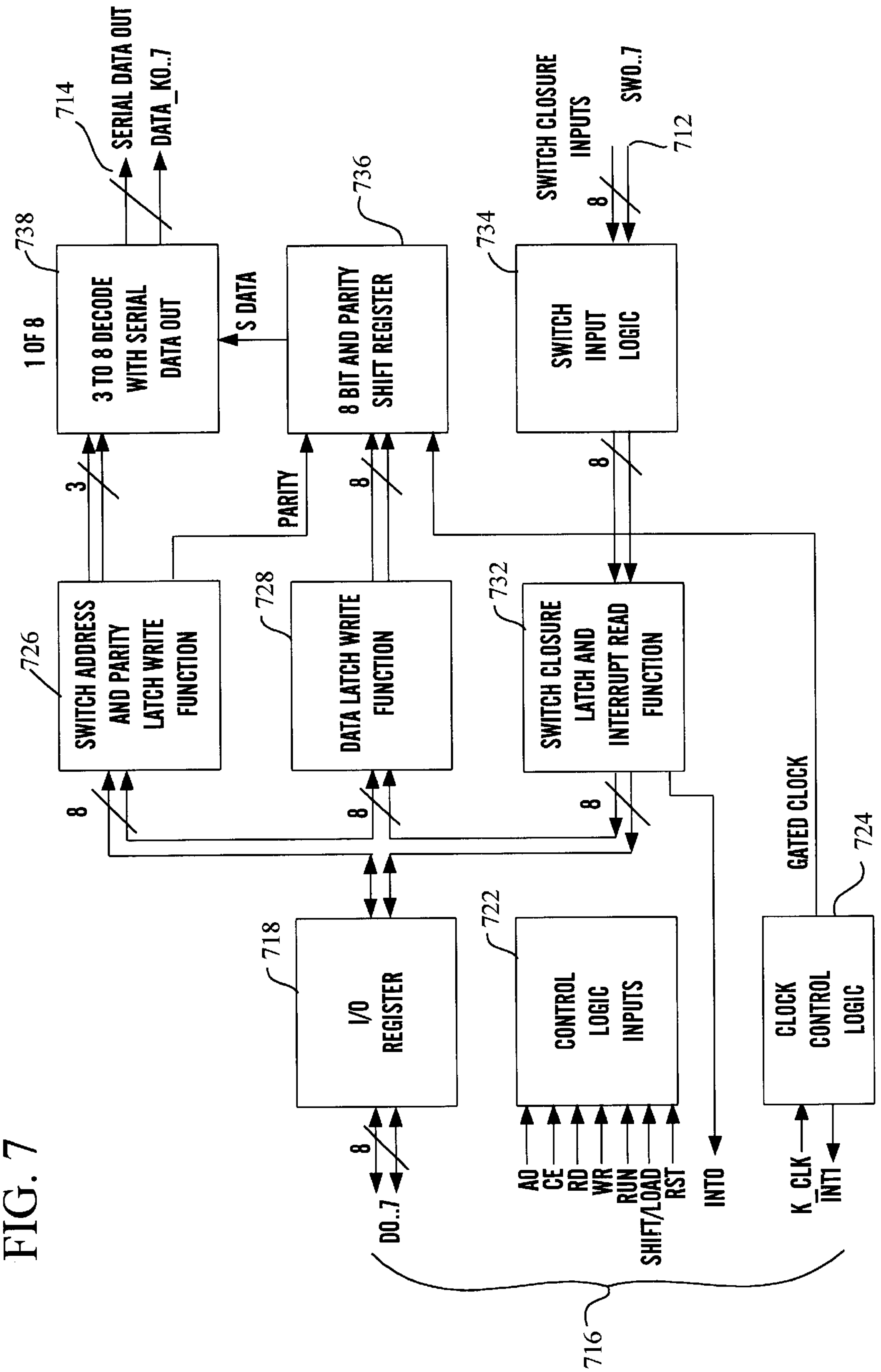
FIG. 7 is a block diagram of a switch controller device for a programmable display switch according to an embodiment of the present invention.

The controller of FIG. 7 includes an I/O register 718 to act as a port through which all reads and writes of the controller 516 occur. The control logic input receives control inputs from the CPU for the operation of the controller 516. The clock control logic 724 controls the serial data clock used e.g. to clock out the serial data to the specific programmable display switch modules. A switch address and parity latch write block 726 provides temporary storage of the switch address (for selecting which switch is to be programmed) and parity information. A data latch write component 728 provides temporary storage for the data that will be written to the programmable display switch module. A switch closure latch and interrupt read device 732 is used to provide an interrupt to the CPU (e.g. when a switch is closed) and to provide an indication back to the CPU of the switch states. The switch input logic 734 conditions the eight inputs from the programmable display switch module's switch. The 8-bit and parity-bit shift register 736 provides the serial data to a 3-to-8 decoder 738 and also provides parallel data and parity to be loaded into the serial word. The 3-to-8 decode decodes the specific programmable display module (address) that will be programmed and provides the serial data output to the switch.

Although an embodiment described above provides programmable display switches in conjunction with a gaming terminal which also has other controllable display devices such as a CRT screen 122, it is also possible to provide a gaming device in which the only programmable or changeable display (e.g. for at least one portion of the game)is that provided by one or more programmable display switch modules, as described herein. FIG. 8 depicts a (simplified) illustration of such a device for playing poker. In the configuration of FIG. 8, a microprocessor 812 is coupled to wager input devices such as a coin input 814 or bill acceptor 816 and is also coupled to a plurality of (an array of) programmable display switches 818*a*–818*f*. In the depicted embodiment, five of the switches 818*a*–818*e* are used for displaying indications of cards in a 5-card hand, and a sixth switch 818f is used for performing certain functions in the game.

FIG. 9 depicts one manner in which the apparatus of FIG. 8 can be used to play a card game in the absence of reading a traditional CRT display. In the embodiment of FIG. 9, the programmable switch array may be controlled to provide an attractive display 912 as described above. After the microprocessor detects that a wager has been received, one or more of the programmable display switches 818 is controlled to display a "deal" label 916. In response to activation of a switch with a "deal" label, the microprocessor will simulate the deal of a hand of cards, such as by randomly selecting five cards of a standard 52-card deck and will control five of the programmable display switches 818*a*–818*e* to display indications of the five dealt cards 918. Preferably, the sixth programmable display switch 818*f*, at this point, displays a label "none" (which the player can use to indicate he or she does not wish to discard any of the dealt cards). If the player wishes to discard any of the dealt cards, the player may select one or more of the displayed cards for discard by pressing or activating the corresponding switch (i.e. the switch which displays an indication of the card to be discarded). Preferably, the player is provided an opportunity to place additional wagers 924 and if desired, one or more of the switches 818 may be configured to provide an opportunity to "Bet 1", "Bet Max" or the like (with display of an appropriate label or legend). Thereupon the microprocessor will select replacement cards, e.g., using a random or pseudo-random number procedure, and display the final hand 926.

Although FIG. 9 and FIG. 8 depict one example of a manner in which a gaming terminal can be provided, using programmable display switch modules as the sole controllable display device, other games (or game portions) and gaming devices that use programmable display switches as the sole display device will be apparent to those of skill in the art after understanding the present disclosure.

In light of the above description, a number of advantages of the present invention can be seen. The present invention can be used to reduce the number of switches or buttons in a gaming terminal, without sacrificing game unpredictability, complexity or interest, e.g. so as to reduce cost, reduce gaming terminal size, avoid customer confusion, reduce the number of parts to be kept in inventory, and the like. The present invention further reduces customer confusion by avoiding buttons bearing multiple labels at any given time, only some of which may be applicable at any given time. The present invention also assists in reducing customer confusion by providing the ability to display, at any given point in a game, only those switch labels that are applicable at that time in the play of the game. The present invention provides the ability to achieve flexible and attractive switches closely associated with switch legends or labels at a reasonable cost and particularly in a manner more cost effective than a typical touch screen implementation. The present invention provides a cost-effective way to achieve switches, displays, and/or integrated switch-display functionality with a relatively high resolution and relatively fast response time, such as may be used in implementing a game of skill and/or implementing animation. The present invention facilitates reduction in maintenance costs by eliminating the need for incandescent bulb backlighting, e.g. by using light-emitting diode backlighting whose relatively long lifetime can reduce or eliminate the need for bulb replacement, bulb inventories, bulb failure detection, and/or certain personnel training. The present invention provides the ability to relatively rapidly and easily reconfigure a gaming terminal, e.g. so as to change the nature or theme of the game being played. For example, some or all of the reconfiguration can be implemented by software procedures alone, specifically without the need to change physical (e.g. printed) switch labels. For example, the present invention can be used to facilitate the casino operator's ability to, e.g., program banks of gaming machines with the same type of games for special tournaments and then to relatively easily reprogram the machines for normal game operation. Similarly, such rapid reconfiguration can permit casino operators to configure or arrange the casino floor as desired without the need to physically move gaming terminals from one location to another. Reconfigurability can also be beneficial to manufacturers of gaming terminals. For example, a manufacturer can more readily provide gaming terminals which can let the player select among numerous games (e.g. select whether to play slot games poker, blackjack or keno) without the need for providing a relatively large or expensive array of game-specific switches. Furthermore, since some or all the differences between a gaming terminal configured for a first game and a gaming terminal configured for a second game can be implemented by software changes (including software changes which change the labels on programmable display switch modules), a gaming manufacturer can market a wide variety of different games or game themes while producing gaming terminals which are substantially identical physically (i.e. in terms of hardware) and loading the appropriate software to implement the ordered or desired game, theme or bonus option.

Figure 13A:
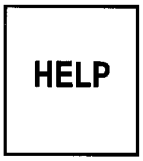
Figure 13B:
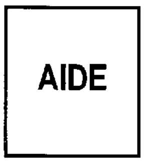

A number of variations and modifications of the invention can be used. Although various embodiments described and depicted above have provided certain numbers of programmable display switches (such as one switch, two switches, eight switches and the like) more or fewer switches than those depicted and described can be used. Although embodiments described above have illustrated how labels can be changed to reflect different functions, it is possible to also select different labels for the same function, such as providing labels in a variety of (selectable) language and/or providing icons or symbols rather than letters or characters to indicate function. Although examples provided herein illustrate how labels may be changed to accommodate different functions during different portions of a game or for playing different types or themes of games, it is also possible to provide for selecting among different switch labels for the same or identical portions of a game such as may be required to comply with local gaming regulations. Although the examples provided herein have illustrated how a microprocessor or other controller in a gaming terminal can be used in conjunction with providing different labels for programmable display switches, it is also possible to provide some or all information for programmable display switch labels from an external source such as an external game controller, cluster controller, central computer, or the like (e.g. over a local area network, wide area network, or the like) e.g. for implementing progressive gaming, Internet or other long-distance gaming and the like. Although an example of a programmable display switch using a backlit liquid crystal array has been provided, other types of programmable displays can also be used such as front-lit or reflective liquid crystal arrays, light emitting diode arrays and the like. Although the examples described above have illustrated how gaming terminals may use programmable display switches with playing or operating a game in its normal gaming mode, it is also possible to provide for use of programmable display switches for other, e.g. non-game, functions, such as for prompting casino operators through procedures for collecting gaming machine status and the like (thus potentially reducing casino operator training time). If desired, the gaming terminal can be configured to allow the user to select which of a plurality of different bonus portions or bonus themes is desired. Another use for programmable switches is to permit the display of multiple language text displays. For example, in the Province of Quebec in Canada where both English and French may be required, the programmable switch may be controlled to alternate between displaying a function in the two languages FIGS. 13A,B.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for operating a gaming terminal to play a game comprising:

providing a gaming terminal having a wager input device and a processor for determining game outcome;

coupling at least a first controllable-legend mechanical switch to said gaming terminal, said controllable-legend mechanical switch having a legend region, said controllable-legend mechanical switch being activatable by applying pressure to said legend region to result in motion of said legend region;

controlling said controllable-legend mechanical switch to display a first legend on said legend region during at least a first time period of a game, wherein activation of said controllable-legend mechanical switch during said first time period results in a first function;

controlling said controllable-legend mechanical switch to display a second legend on said legend region, different from said first legend, at least during a second time period of the same game, wherein activation of said controllable-legend mechanical switch during said second time period results in a second function, different from said first function.

2. A method, as claimed in claim 1, wherein said controllable-legend mechanical switch includes a backlight and a plurality of controllable liquid crystal pixels for blocking said backlight in a controllable pattern.

3. A method, as claimed in claim 1 wherein said controllable legend mechanical switch includes a controllable-color backlight.

4. A method, as claimed in claim 3 wherein controlling said legend comprises controlling the color of said backlight.

5. A method, as claimed in claim 1 wherein said first legend includes indicia indicating said first function.

6. A method, as claimed in claim 1 wherein said first legend is an animated legend.

7. A method, as claimed in claim 1 wherein said gaming device includes at least a first user control and further comprising changing said legend in response to said first user control.

8. A method, as claimed in claim 7 wherein said first user control is provided in the absence of a controllable legend.

9. A method as claimed in claim 7 wherein said first user control is a controllable legend mechanical switch.

10. A method as claimed in claim 1 wherein said game has a first portion which includes a plurality of possible outcomes, including at least one winning outcome associated with a prize award, and wherein a second portion of said game is a bonus portion which is played only in response to predetermined ones of said plurality of outcomes.

11. A method as claimed in claim 10 wherein said bonus portion is used to determine the magnitude of said prize.

12. A method, as claimed in claim 1 wherein said first function is performed only it said controllable-legend mechanical switch is activated within a predetermined period after display of said first legend.

13. A method, as claimed in claim 1 wherein said first function is a function to multiply a prize amount by a first value.

14. A method, as claimed in claim 13 wherein said second function is a function to multiply said prize amount by a second value, different from said first value.

15. A method, as claimed in claim 1 wherein said controllable-legend mechanical switch is controlled to display a legend in first and second different languages at different times.

16. A simulated card game apparatus comprising:

a wager input device;

a microprocessor for determining a game outcome;

a plurality of controllable-legend mechanical switches;

each of said controllable-legend mechanical switches having a legend region;

said controllable-legend mechanical switches being activatable by applying pressure to said legend region to result in motion of said legend region;

wherein at least some of said controllable-legend mechanical switches are controlled during a game to display indicia on said legend regions indicating cards in a card hand during the same game, to permit a user to actuate at least one of a plurality of said controllable-legend mechanical switches for indicating a discard or a hold of a card indicated by changed indicia on said legend region at least one switch.

17. A gaming terminal apparatus for playing a game comprising:

a gaming terminal having a wager input device and a processor for determining game outcome;

at least a first controllable-legend mechanical switch coupled to said gaming terminal, said controllable-legend mechanical switch having a legend region, said controllable-legend mechanical switch being activatable by applying pressure to said legend region to result in motion of said legend region;

means for controlling said controllable-legend mechanical switch to display a first legend on said legend region during a first portion of said game, wherein activation of said controllable-legend mechanical switch during said first portion of said game results in a first function;

means for controlling said controllable-legend mechanical switch to display a second legend on said legend region, different from said first legend, during a second portion of the same game, wherein activation of said controllable-legend mechanical switch during said second portion of said game results in a second function, different from said first function.

18. Apparatus, as claimed in claim 17 wherein said controllable-legend mechanical switch includes a backlight and a plurality of controllable liquid crystal pixels for blocking said backlight in a controllable pattern.

19. Apparatus, as claimed in claim 18 wherein said controllable-legend mechanical switch includes a controllable-color backlight.

20. Apparatus, as claimed in claim 19 wherein said means for controlling said legend comprises means for controlling the color of said backlight.

21. Apparatus, as claimed in claim 18 wherein said first legend includes indicia indicating said first function.

22. Apparatus, as claimed in claim 18 wherein said first legend is an animated legend.

23. Apparatus, as claimed in claim 18 wherein said gaming device includes at least a first user control and further comprising means for changing said legend in response to said first user control.

24. Apparatus, as claimed in claim 23 wherein said first user control is provided in the absence of a controllable legend.

25. Apparatus as claimed in claim 23 wherein said first user control is a controllable-legend mechanical switch.

26. Apparatus, as claimed in claim 17, wherein said first function is performed only if said controllable-legend mechanical switch is activated within a predetermined period after display of said first legend.

27. Apparatus, as claimed in claim 17 wherein said first function is a function to multiply a prize amount by a first value.

28. Apparatus, as claimed in claim 27 wherein said second function is a function to multiply said prize amount by a second value, different from said first value.

29. Apparatus, as claimed in claim 17 wherein said controllable-legend mechanical switch is controlled to display a legend in first and second different languages at different times.

30. A method for operating a gaming terminal to play a game comprising:

providing a gaming terminal having a wager input device and a processor for determining game outcome;

coupling at least a first-controllable-legend mechanical switch to said gaming terminal, said controllable-legend mechanical switch having a legend region;

controlling said controllable-legend mechanical switch to display a first legend during a first time period of a game;

wherein, when said controllable-legend switch is activated during a defined time period of the same game, at least a first prize, to be awarded in response to at least a first game outcome, is multiplied by a first value.

31. A method as claimed in claim 30 wherein said defined time period is said first time period.

32. A method, as claimed in claim 30, wherein the magnitude of said first value is displayed on said first switch legend.

33. A method, as claimed in claim 30 wherein the magnitude of said value is not indicated on said first legend, whereby a player is unaware of said magnitude until after said switch is activated.

34. A method, as claimed in claim 30 further comprising:

controlling said controllable-legend mechanical switch to display a second legend during a second time period;

wherein, when said controllable-legend switch is activated during said second time period, at least first said prize is multiplied by a second value, different from said first value.

35. A method for operating a gaming terminal to play a game comprising:

providing a gaming terminal having a wager input device and a processor for determining game outcome;

coupling at least a first controllable-legend mechanical switch to said gaming terminal, said controllable-legend mechanical switch having a legend region;

controlling said controllable-legend mechanical switch to display a legend during a first time Period, in a first language;

controlling said controllable-legend mechanical switch to display a legend during a second time period in a second language, different from said first language;

wherein activation of said controllable-legend mechanical switch during said first time period results in a first function and activation of said controllable-legend mechanical switch during said second time period results in said first function.

36. A method, as claimed in claim 35 wherein said legend in said first language and said legend in said second language are translations of one another.

37. The method of claim 35 in which said first and second time periods are part of the same game.

38. The method of claim 35 in which said controllable-legend mechanical switch includes a backlight and a plurality of controllable liquid crystal pixels for blocking said backlight in a controllable pattern.

39. A method for operating a gaming terminal to play a game comprising:

providing a gaming terminal having a wager input device and a processor for determining game outcome;

coupling at least a first controllable-legend mechanical switch to said gaming terminal, said controllable-legend mechanical switch having a legend region, said controllable-legend mechanical switch being activated by applying pressure to said legend region to result in motion of said legend region;

controlling said controllable-legend mechanical switch to display a first legend during at least a first time period of a game, wherein activation of said controllable-legend mechanical switch during said first time period results in a first function to multiply a prize amount by a first values controlling said controllable-legend mechanical switch to display a Second legend, different from said first legend, at least during a second time period of the same game, wherein activation of said controllable-legend mechanical switch during said second time period results in a second function to multiply a prize amount by a second value, different from said first value; and displaying said first and second values on said switch legends respectively at first and second times.

40. The method of claim 39 in which the magnitude of said first value is not indicated on said first legend until said switch is activated, whereby said player is unaware of said magnitude until after said switch is activated.

41. A gaming terminal apparatus for playing a game comprising:

a gaming terminal having a wager input device and a processor for determining game outcome;

at least a first controllable-legend mechanical switch coupled to said gaming terminal, said controllable-legend mechanical switch having a legend region, said controllable-legend mechanical switch being activatable by applying pressure to said legend region to result in motion of said legend region;

means for controlling said controllable-legend mechanical switch to display a first legend during a first portion of said game, wherein activation of said controllable-legend mechanical switch during said first portion of said game results in a first function to multiply a prize amount by a first value;

means for controlling said controllable-legend mechanical switch to display a second legend, different from said first legend during a second portion of the same game, wherein activation of said controllable-legend mechanical switch during said second portion of said game results in a second function different from said first function, to multiply said prize amount by a second value, different from said first value, wherein the magnitude of said first and second values are displayed on said switch legends at first and second times respectively.

42. The apparatus of claim 41 in which the magnitude of said value is not indicated on said first legend until after said switch is activated, whereby a player is unaware of said magnitude until after said switch is activated.

* * * * *